United States Patent [19]
Chan et al.

[11] Patent Number: 6,005,395
[45] Date of Patent: Dec. 21, 1999

[54] METHOD AND APPARATUS FOR SENSING PISTON POSITION

[75] Inventors: Danley C. Chan, West Burlington, Iowa; Alan D. Berger, Winfield, Ill.

[73] Assignee: Case Corporation, Racine, Wis.

[21] Appl. No.: 08/969,432

[22] Filed: Nov. 12, 1997

[51] Int. Cl.[6] .................................................. G01R 27/04
[52] U.S. Cl. .............................. 324/635; 92/1 R; 91/67; 324/642
[58] Field of Search .................................... 324/637, 635, 324/642, 639; 92/5 R; 91/167

[56] References Cited

U.S. PATENT DOCUMENTS

| | | |
|---|---|---|
| 3,160,836 | 12/1964 | Farley . |
| 4,126,047 | 11/1978 | Sethares et al. . |
| 4,520,660 | 6/1985 | Hitchcock . |
| 4,543,649 | 9/1985 | Head et al. . |
| 4,584,472 | 4/1986 | Wiblin et al. . |
| 4,588,953 | 5/1986 | Krage . |
| 4,631,478 | 12/1986 | Knetsch et al. . |
| 4,689,553 | 8/1987 | Haddox . |
| 4,737,705 | 4/1988 | Bitar et al. . |
| 4,742,794 | 5/1988 | Hagstrom . |
| 4,757,745 | 7/1988 | Taplin . |
| 4,774,465 | 9/1988 | Nilius . |
| 4,866,269 | 9/1989 | Wlodarczyk et al. . |
| 4,901,628 | 2/1990 | Krage . |
| 4,938,054 | 7/1990 | Dye et al. . |
| 4,961,055 | 10/1990 | Habib et al. . |
| 4,987,823 | 1/1991 | Taplin et al. . |
| 5,000,650 | 3/1991 | Brewer et al. . |
| 5,104,144 | 4/1992 | Bethell . |
| 5,150,060 | 9/1992 | Bitar . |
| 5,182,890 | 2/1993 | Greer . |
| 5,182,979 | 2/1993 | Morgan . |
| 5,233,293 | 8/1993 | Huang et al. . |
| 5,241,278 | 8/1993 | Bitar . |
| 5,247,172 | 9/1993 | Riemer . |
| 5,260,665 | 11/1993 | Goldberg et al. . |

(List continued on next page.)

FOREIGN PATENT DOCUMENTS

| | | |
|---|---|---|
| 266606A2 | 5/1988 | European Pat. Off. . |
| 31 16 333A | 11/1982 | Germany . |
| 94 17204 U | 2/1995 | Germany . |
| 2172995A | 10/1986 | United Kingdom . |

OTHER PUBLICATIONS

Brochure: Penny + Giles, *Technology Leaders in Displacement Monitoring & Manual Control* Jul. 1989.
Brochure: DC Hydrastar, Position Transducer.
Sensors: *An LVDT Primer*, Jun. 1996.
Brochure: Understanding Magnetostictive LDTS, Hydraulics & Pneumatics, by W.D. Peterson, Feb. 1993.
Brochure: Penny + Giles Product Data, Cylinder Transducer Model HLP100 Oct. 1990.
Magazine: *Business Week*, Not Just A Blip On The Screen, Feb. 19, 1996.

*Primary Examiner*—Maura Regan
*Attorney, Agent, or Firm*—Foley & Lardner

[57] ABSTRACT

A system for determining the position of a piston moveable within a cylinder, or of an implement or joint, is disclosed herein. Electromagnetic (EM) bursts such as ultra-wideband or frequency pulses are generated and applied to a transmitter/receiver unit. The EM bursts are launched by the transmitter via a focusing antenna assembly from an end of the cylinder housing towards the piston. The fluid in the cylinder housing is in electrical communication with the piston such that a surface of the piston represents an electrical impedance discontinuity which causes the EM bursts to be reflected back to the receiver. The time for the EM bursts to travel from the transmitter to the piston and for the reflections to travel back to the receiver via the antenna assembly is determined and converted into a position signal representing the piston's position. A compensation signal can be used to compensate the position signal for variations in a parameter of the fluid within the cylinder. The parameter may be the dielectric constant, and the variations may be caused by factors such as temperature, contamination and fluid type. The compensation circuit can include a pulse level analyzer, resonance circuit, mini-dipstick, or a capacitance circuit.

26 Claims, 5 Drawing Sheets

U.S. PATENT DOCUMENTS

| | | |
|---|---|---|
| 5,274,271 | 12/1993 | McEwan . |
| 5,325,063 | 6/1994 | Morgan . |
| 5,332,938 | 7/1994 | McEwan . |
| 5,345,471 | 9/1994 | McEwan . |
| 5,361,070 | 11/1994 | McEwan . |
| 5,421,416 | 6/1995 | Orbach et al. . |
| 5,422,607 | 6/1995 | McEwan . |
| 5,438,261 | 8/1995 | Codina et al. . |
| 5,438,274 | 8/1995 | Bitar et al. . |
| 5,455,769 | 10/1995 | Panoushek et al. . |
| 5,457,394 | 10/1995 | McEwan . |
| 5,465,094 | 11/1995 | McEwan . |
| 5,471,147 | 11/1995 | Allen et al. . |
| 5,471,162 | 11/1995 | McEwan . |
| 5,479,120 | 12/1995 | McEwan . |
| 5,491,422 | 2/1996 | Bitar et al. . |
| 5,510,800 | 4/1996 | McEwan . |
| 5,512,834 | 4/1996 | McEwan . |
| 5,517,198 | 5/1996 | McEwan . |
| 5,519,342 | 5/1996 | McEwan . |
| 5,519,400 | 5/1996 | McEwan . |
| 5,521,600 | 5/1996 | McEwan . |
| 5,523,760 | 6/1996 | McEwan . |
| 5,536,536 | 7/1996 | Kelley . |
| 5,540,137 | 7/1996 | Lark et al. . |
| 5,563,605 | 10/1996 | McEwan . |
| 5,573,012 | 11/1996 | McEwan . |
| 5,576,627 | 11/1996 | McEwan . |
| 5,581,256 | 12/1996 | McEwan . |
| 5,589,838 | 12/1996 | McEwan . |
| 5,609,059 | 3/1997 | McEwan . |
| 5,617,034 | 4/1997 | Lark et al. . |

METHOD AND APPARATUS FOR SENSING PISTON POSITION

FIELD OF THE INVENTION

The invention generally relates to determining the position or orientation of an implement or joint of an agricultural vehicle (e.g., tractor, combine, etc.), or construction vehicle (e.g., backhoe, crane, dozer, trencher, wheeled, tracked, or skid-steer loader, etc.). In particular, the invention relates to transmitting electromagnetic (EM) bursts through a fluid in a hydraulic or pneumatic cylinder used to move an implement or joint, detecting reflections of the bursts from a piston moveable within a housing, and determining the position of the piston based upon the time between transmitting the bursts and detecting the reflections.

BACKGROUND OF THE INVENTION

Pneumatic and hydraulic cylinders are extensively used in actuator assemblies for moving implements, arms, booms and other components of mobile hydraulic machines such as tractors, combines, excavators, dozers, loader-backhoes, etc. For example, tractor-mounted implements such as plows are typically supported by hitch assemblies which include hydraulic cylinders for raising and lowering the implements. Harvesting heads on combines, blades on dozers, and buckets on loader-backhoes are further examples of implements typically positioned by hydraulic cylinders.

Electrohydraulic control systems for such actuator assemblies require position feedback signals representing the positions of the implements or mechanical joints being controlled. Some sensing assemblies (e.g., LVDTs) which provide position feedback signals are coupled to implements or mechanical joints using external linkages. External sensing assemblies, however, are subject to external impacts and other environmental influences.

The positions of implements or mechanical joints can also be determined using sensing assemblies internal to the cylinder. The internal sensing assemblies measure the extension of the cylinders which move the implements or mechanical joints. Cylinder extension is determined by measuring the position of the piston within the cylinder housing. The piston, in turn, moves a cylinder rod coupled to the implement or mechanical joint. The position of the implement or the joint is then determined as a function of piston position which depends upon the geometry of the particular mechanical system.

Various forms of apparatus for measuring positions of pistons within hydraulic cylinders are available. For example, the positions of pistons within cylinders have been measured using acoustic signals, radiofrequency (RF) signals and microwave signals with different sensing assemblies and circuit configurations. However, these apparatus suffer from such drawbacks as relatively high complexity and cost, relatively low reliability, durability and accuracy, and the need to extensively modify the cylinders to accommodate the sensing assembly.

SUMMARY OF THE INVENTION

Accordingly, one embodiment of the present invention provides a method of determining the position of a piston moveable within a cylinder housing. The cylinder housing encloses a cavity filled with a fluid. The method includes generating electromagnetic (EM) bursts, launching the EM bursts towards the piston through the fluid within the cavity in the cylinder housing, detecting reflections of the EM bursts from the piston, generating a timing signal representative of the time between launching the EM bursts and detecting the reflections, and converting the timing signal into a position signal representative of the position of the piston within the cylinder housing.

Another embodiment of the present invention provides an apparatus for determining the position of a piston moveable within a cylinder housing wherein the cylinder housing encloses a cavity filled with a fluid. The apparatus includes a generator for generating EM bursts. A transmitter is coupled to the generator and to the cylinder housing. The transmitter launches the EM bursts towards the piston through the fluid within the cavity in the cylinder housing with a focusing antenna assembly. A receiver is coupled to the cylinder housing and detects reflections after the EM bursts are reflected by the piston towards the receiver via the antenna assembly. A timing circuit generates a timing signal representative of the time for the EM bursts to travel from the transmitter to the piston and for the reflections to travel from the piston to the receiver. A conversion circuit converts the timing signal into a position signal representative of the position of the piston within the cylinder housing.

Another embodiment of the present invention provides an electrohydraulic control system for controlling the position of an implement. The implement has at least one joint which is moved by extending or retracting at least one cylinder. The control system includes an input device which generates command signals representative of a commanded position of the implement. The control system also includes a source of pressurized hydraulic fluid. A valve assembly, which is located between the cylinder and the source, controls the flow of hydraulic fluid between the cylinder and the source in response to control signals. A micropower impulse radar (MIR) sensor system coupled to the cylinder senses movement of the cylinder and generates a position signal representative of the position of the implement. A control circuit is coupled to the input device, the valve assembly and the MIR sensor system. The control circuit generates the control signals based upon the command signals and the position signal and applies the control signals to the valve assembly.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
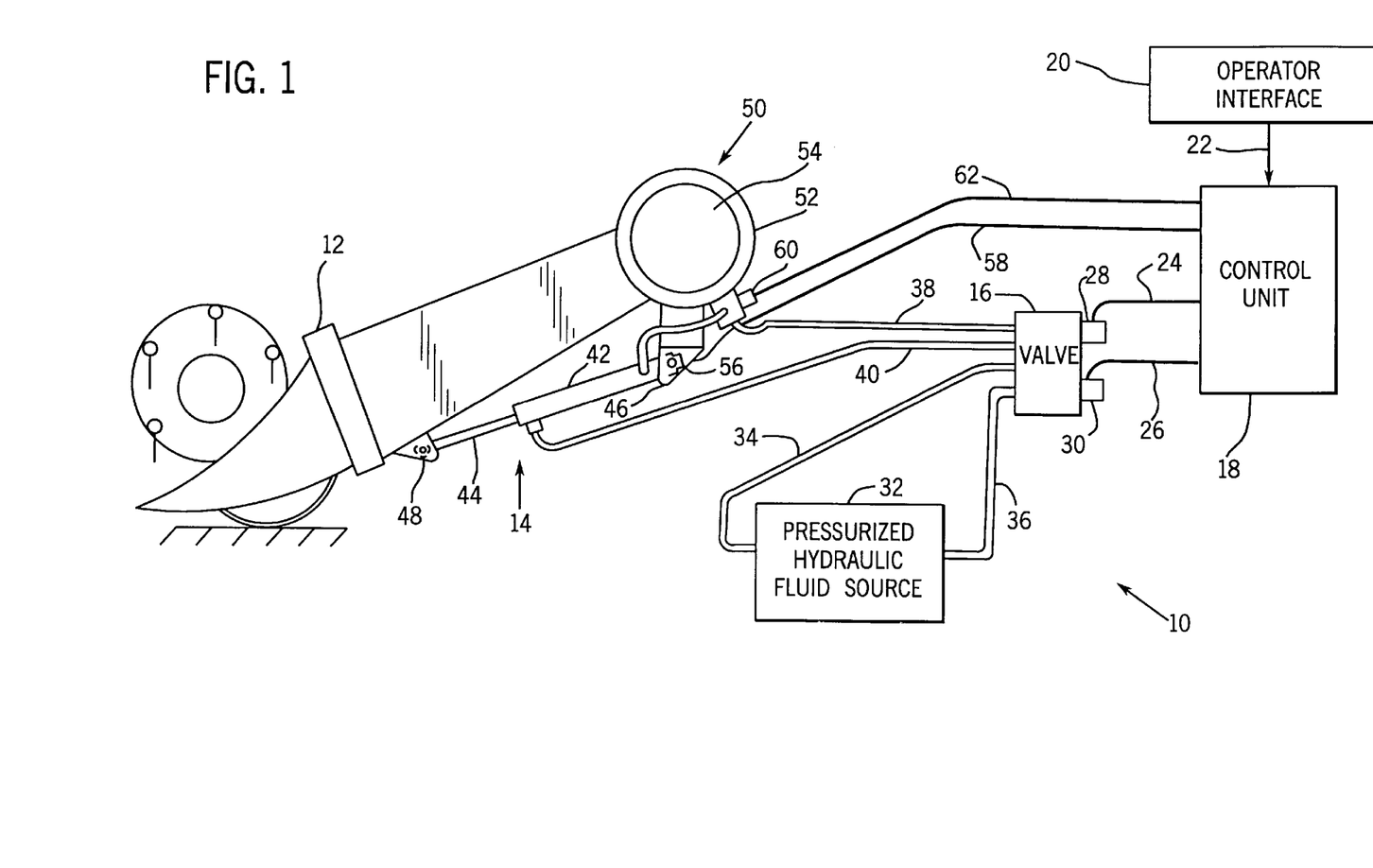
FIG. 1 is a block diagram illustrating an implement position control system for an off-highway vehicle.

Referring to FIG. 1, an electrohydraulic control system 10 used in an off-highway vehicle is shown. This system controls the position or orientation of a joint or implement 12 (e.g., head, plow, bucket, blade, etc.) of an agricultural vehicle (e.g., tractor, combine, etc.), or construction vehicle (e.g., backhoe, crane, dozer, trencher, wheeled, tracked or skid-steer loader, etc.).

Control system 10 controls the position of implement 12 using a hydraulic actuator 14 supplied with pressurized hydraulic fluid from a valve assembly 16. Valve assembly 16 receives raise and lower signals from a control unit 18 in response to commands from an operator interface 20. Control unit 18 can control the position of implement 12 in a closed-loop as described below.

Control unit 18 includes a microprocessor-based circuit or a dedicated, specific-purpose hard-wired circuit. Operator interface 20 includes operator-actuatable command devices such as potentiometers and switches which generate command signals sent to control unit 18 via a signal bus 22. The command signals, for example, represent raise and lower signals, reference position signals, raise and lower rate signals and mode select signals (e.g., manual, replay, return-to-position, float or height control mode). Other applications include different command devices which generate command signals appropriate for the particular application.

In response to the command signals from operator interface 20, control unit 18 generates a raise signal 24 and a lower signal 26 which are applied to a raise solenoid 28 and a lower solenoid 30 mounted on valve assembly 16, respectively. Raise signal 24 and lower signal 26 may be, for example, pulse-width-modulated (PWM) signals. In response to signals 24 and 26, valve assembly 16 controls the flow of pressurized hydraulic fluid between a source 32 and hydraulic actuator 14. Source 32 includes a pump connected in series with a fluid storage tank and filters (not shown). The hydraulic fluid is transferred through conduits (e.g, hoses, tubes, etc.) 34, 36, 38 and 40.

In the present embodiment, actuator 14 includes a hydraulic cylinder having a cylinder housing 42 and a cylinder rod 44 which is moved in the longitudinal direction of the cylinder by a piston 66 (shown in FIG. 2) within cylinder housing 42. By way of a further example, a pneumatic cylinder may be used for other applications. In pneumatic cylinder applications, a pressurized gas is used as the fluid. The force which drives piston 66 is provided by the pressurized hydraulic fluid supplied to actuator 14 by valve assembly 16. The actuator 14 is connected between first and second attachment members 46 and 48 such that changes in the piston's position change the position or orientation of implement 12. Actuator 14 can also be oriented in the reverse direction such that rod 44 connects to attachment member 46 instead of 48.

Implement 12 is supported by a vehicle (not shown) using a bearing assembly 50 including first and second bearing portions 52 and 54. First bearing portion 52 is fixed and second bearing portion 54 is rotatable with respect to the vehicle. Implement 12 is fastened to second bearing portion 54 such that implement 12 is rotatable about the axis of bearing assembly 50. First and second attachment members 46 and 48 are connected to first bearing portion 52 and implement 12, respectively, so changes in extension of the cylinder cause implement 12 to rotate with respect to the vehicle.

Control unit 18 receives a position feedback signal from a position sensing unit 56 via bus 58 and a pressure signal from a pressure sensor 60 via bus 62. Position sensing unit 56 is coupled to cylinder housing 42 as described below. Position sensing unit 56 replaces other position sensors such as LVDTs mounted between implement 12 and bearing portion 52 by external linkages. Pressure sensor 60 measures the pressure of the hydraulic fluid.

In operation, command devices within operator interface 20 send desired command signals to control unit 18. Control unit 18 responds by generating raise and lower signals and applying them to raise and lower solenoids 28 and 30 of valve assembly 16. Valve assembly 16 selectively controls the flow of pressurized hydraulic fluid from source 32 to front and rear ports of cylinder housing 42 which causes piston 66 within the cylinder to move longitudinally. Movement of piston 66 causes cylinder rod 44 to extend or retract, thereby changing the distance between attachment members 46 and 48. An increased distance causes implement 12 to rotate clockwise about bearing assembly 50 and a decreased distance causes implement 12 to rotate in the counterclockwise direction. Extension or retraction of the cylinder is forced by hydraulic fluid, or can be determined by the interaction of implement 12 with the ground (e.g., in float mode). The position of implement 12 and the pressure of the fluid are provided to control unit 18 by position sensing unit 56 and pressure sensor 60. Thus, the position of implement 12 can be controlled in closed-loop fashion based upon an error signal between the command signals from operator interface 20 and position feedback signals from position sensing unit 56.

Control system 10, except for position sensing unit 56 and its interface, is further described in U.S. Pat. No. 5,455,769, commonly assigned and incorporated herein by reference. A control system for a tractor hitch assembly is described in U.S. Pat. No. 5,421,416, and a system to move an arm on a construction vehicle using a cylinder is described in U.S. Pat. No. 5,000,650, both commonly assigned and incorporated herein by reference.

Position sensing system 56 determines the position or orientation of implement 12 by measuring the position of piston 66 within cylinder housing 42. Once the piston position is known, control unit 18 can calculate the position or orientation of implement 12 as a function of piston position and the geometrical parameters of the machine system. Position sensing system 56 includes a micropower impulse radar (MIR) as explained below.

Figure 2:
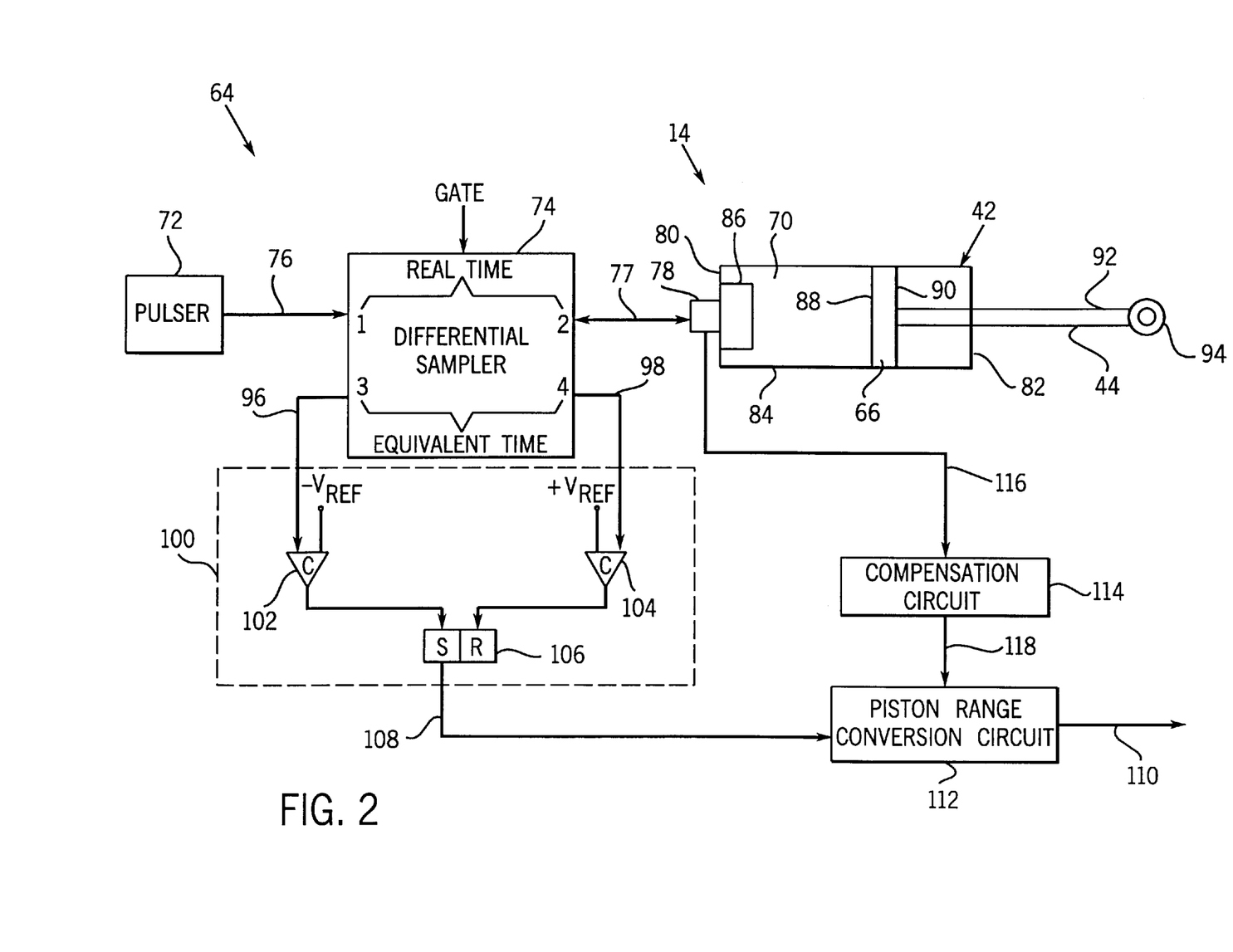
FIG. 2 is a block diagram showing a hydraulic cylinder and a circuit for sensing the position of a piston moveable within the cylinder by transmitting and receiving electromagnetic (EM) bursts such as ultra-wideband (UWB) pulses through a fluid within a housing surrounding the cylinder.

FIG. 2 shows hydraulic actuator 14 and an MIR circuit 64 for sensing the position of piston 66 by transmitting and receiving electromagnetic (EM) pulses or bursts through the pressurized hydraulic fluid within a cavity 70 in cylinder housing 42. A sequence of EM bursts are generated by a generator 72 and applied to a directional sampler 74 via a transmission line 76.

Preferably, the EM bursts are ultra-wideband (UWB) or square-wave pulses. U.S. Pat. No. 5,457,394, herein incorporated by reference, describes a circuit including a generator of UWB pulses which are 200 psec rise time square-wave pulses repeated at a pulse-repetition interval (PRI) of 1 Mhz. However, other pulse widths and PRIs can be used. The UWB pulses are repeated to allow the integration or averaging of approximately 10,000 reflected pulses for increased noise immunity. Noise immunity can be further increased by modulating (e.g., dithering or randomizing) the pulses. The UWB pulses are unlike acoustic, RF and microwave signals since they are a sequence of impulses having no carrier frequency. No specific frequency is associated with the UWB pulses, and the frequency spectrum is related by the Fourier transform of the pulses. The UWB term refers to the wide spectrum of frequencies comprising the pulses. A timing generator with a crystal oscillator for high accuracy is described in U.S. Pat. No. 5,563,605, incorporated herein by reference. A circuit used to generate a GATE input signal for sampler 74 is also described in this patent.

The EM bursts, however, are not limited to square pulses and bursts may include pulses having any shape and form, including pulses generated by a highly-focused antenna. For example, the pulses may include sine-wave signals or a combination of sine-wave signals having a carrier frequency component in the RF, microwave, etc. signal range. The frequency pulses are repeated at a predetermined frequency less than the frequency of the carrier. Although the sampling circuit described below can process frequency pulses, the circuitry for generating frequency pulses is more complex and expensive than the circuitry used to generate square pulses. The remainder of this description assumes that the EM bursts are UWB pulses. However, as noted, pulses having a frequency component can also be used.

Directional sampler 74 includes four ports. Ports 1 and 2 are "real-time" bidirectional ports. Port 1 receives the UWB transmit (T) pulses from pulse generator 72 and couples the T pulses to port 2. Port 2 transmits the real-time T pulses through interconnect cable 77 to a transmitter/receiver unit 78, and receives a portion of the T pulses as real-time reflected (R) pulses from unit 78. Ports 3 and 4 are sampled "equivalent-time" ports that output signals from a differential sampler within directional sampler 74. Thus, ports 3 and 4 are not bidirectional. Port 3 is coupled to port 1 in equivalent time and is isolated from the R pulses at port 2. Port 3 generates an equivalent-time replica of the T pulses at port 1. For example, when the real-time T pulses at port 1 have a 200 psec pulse-width, the equivalent-time replica of the T pulses appearing at port 3 have a pulse width of 200 usec. Port 4 is coupled to port 2 in equivalent time and is isolated from the T pulses at port 1. Port 4 generates an equivalent-time replica of the R pulses at port 2. Thus, equivalent-time replicas of the T and R signals at ports 1 and 2 appear at ports 3 and 4.

The isolation between port 3 and the R pulses and between port 4 and the T pulses allows directional sampler 74 to accurately distinguish the T pulses from the R pulses even when the T and R pulses overlap, such as when piston 66 is close to transmitter/receiver unit 78. Directional sampler 74 is further described in U.S. Pat. No. 5,517,198, incorporated herein by reference.

Transmitter/receiver unit 78 is coupled to the rear end 80 of cylinder housing 42. Cylinder housing 42 also has a front end 82 and a cylindrical side wall 84 between ends 80 and 82. As shown in FIG. 2, transmitter/receiver unit 78 can be coupled to rear end 80 substantially at the longitudinal axis of the cylinder.

Transmitter/receiver unit 78 is in electrical communication with the fluid via an antenna assembly 86 supported by rear end 80. Antenna assembly 86 consists of separate transmitting and receiving antennas, or it may consist of a single antenna used for both transmitting and receiving. The hydraulic fluid makes electrical contact with antenna assembly 86 such that the T pulses applied to the transmitter of unit 78 are focused and launched into the pressurized fluid towards piston 66. In one embodiment of the present invention, the cylinder is of a relatively short and wide geometry so as to limit the reflections of the T pulses off side walls 84 (e.g., the cylinder is approximately >=6" diameter and <=6" length).

Transmitter/receiver unit 78 can be integral (i.e., one-piece) with antenna assembly 86, or can be separate and connected by wires. An integral unit may be more cost-effective, and a separate unit may increase flexibility in mounting unit 78. The transmitter is described in U.S. Pat. Nos. 5,457,394 and 5,517,198, incorporated herein by reference, and the receiver is described in U.S. Pat. Nos. 5,523,760 and 5,345,471, incorporated herein by reference.

Piston 66 includes a rear surface 88 and a front surface 90. As pulses from antenna assembly 86 reach rear surface 88, the electrical impedance discontinuity between piston 66 and the adjacent hydraulic fluid causes reflections which travel back through the fluid to unit 78. The time for a transmitted pulse to travel from the transmitter to piston 66 and for a reflected pulse to travel back to the receiver depends upon the position of piston 66. Cylinder rod 44 includes a free end 92 which may be attached to a rod eye 94 for attachment to implement 12. However, rod eye 94 may be replaced with any suitable mechanical interface for transferring force to the implement, arm or boom being moved.

The equivalent-time T and R signals appearing at ports 3 and 4 of directional sampler 74 are applied via lines 96 and 98 to a directional set/reset circuit 100. Circuit 100 includes first and second threshold comparators 102 and 104, and a set/reset flip-flop 106. Threshold comparators 102 and 104 compare the equivalent-time replicas of the T and R signals with voltage references $-V_{REF}$ and $+V_{REF}$ that have voltage levels of about half of the peak amplitudes of the T and R signals, respectively. The outputs of comparators 102 and 104 set and reset flip-flop 106, respectively. Flip-flop 106 outputs a variable-width range pulse on line 108.

In operation, real-time T pulses from pulse generator 72 are applied to port 1 of directional sampler 74, coupled in real-time to port 2, and applied to transmitter/receiver unit 78. The T pulses are launched towards piston 66 through the pressurized hydraulic fluid within cavity 70 and are reflected by the impedance discontinuity at piston 66. The reflected pulses are detected by the receiver as real-time R pulses. Equivalent-time replicas of the real-time T and R pulses appear at ports 3 and 4 of directional sampler 74. The replicas are applied to directional set/reset circuit 100 such that flip-flop 106 is set by the equivalent-time T signal and reset by the equivalent-time R signal. The pulse width of the output from flip-flop 106 represents the time for UWB pulses to travel from the transmitter to piston 66 and for the reflected pulses to travel from piston 66 back to the receiver.

Circuit 64 is accurate even when the T and R pulses are close or even overlap in time. The reflected R signal is isolated from port 3 and cannot set flip-flop 106, and the transmitted T signal is isolated from port 4 and cannot reset flip-flop 106. Thus, the position of piston 66 within the cylinder is measured accurately even when piston 66 is close to antenna assembly 86.

The variable-width range pulse on line 108 is converted to a position signal 110 by a piston range conversion circuit 112. In one embodiment, conversion circuit 112 includes a range counter gated by the variable-width range pulse. If the equivalent-time range scale is 1 msec=1 inch and the clock speed of the counter is 1 Mhz, the range counter will record 1000 counts/inch for a resolution of 0.001 inch/count. The counter value can be read by a microprocessor or microcontroller and converted into a scaled digital position signal for use by a control algorithm.

In another embodiment, conversion circuit 112 includes analog circuitry to convert the variable-width range pulse into an analog signal (e.g., a DC voltage or current, PWM signal or another type of electrical signal) which represents the position of piston 66. Interface circuits to convert a variable-width pulse into various types of electrical signals are known, and may provide a less expensive circuit than a microprocessor circuit.

Thus, circuit 64 operates in the time domain since the position of piston 66 is measured by the equivalent-time signal on line 108. This is true regardless of whether the EM bursts include UWB pulses or pulses having a frequency component. Operation in the time domain simplifies the circuitry compared with operation in the frequency domain (e.g., measuring piston position by determining the resonance frequency of a cavity formed by the piston and the cylinder).

In pneumatic cylinder applications, the electrical parameters of the air within the cylinder are relatively stable with respect to temperature. Thus, the piston position signal may not need to be compensated for variations in the air's characteristics. In hydraulic cylinder applications, however, electrical parameters of the oil within the cylinder affect the speed at which the transmitted and reflected pulses travel. In particular, the speed of the pulses depends upon the dielectric constant of the surrounding fluid, which in turn depends upon factors such as the temperature of the fluid, contamination of the fluid, and type of fluid. Thus, the piston position signal is compensated to account for variations in the dielectric constant of the fluid.

Referring still to FIG. 2, the dielectric constant of the hydraulic oil can be detected using a compensation circuit 114. In this embodiment, compensation circuit 114 receives the real-time T signal on line 116 from unit 78 and generates a compensation signal 118 applied to conversion circuit 112. The real-time T signal can be tapped at antenna assembly 86, or at an internal node of unit 78. Compensation circuit 114 can include a pulse level analyzer (PLA) to measure the amplitude or level of the T signal. The PLA includes, for example, a peak-level detector which locks onto the peak voltage of the T signal. Since the energy per T pulse is constant, electrical characteristics (i.e., dielectric constant) of the fluid surrounding the launching plate affects the voltage caused by the launched constant-energy pulse. The output of the peak-level detector is used to generate compensation signal 118 representing the peak voltage. Compensation signal 118 may be, for example, a voltage or a current. Thus, compensation signal 118 is responsive to the dielectric constant of the hydraulic fluid.

Other implementations of compensation circuit 114 can be used to generate compensation signals representing the dielectric constant of the fluid. For example, compensation circuit 114 can generate excitation signals at varying frequencies, apply the excitation signals to a body having a cavity filled with the fluid, and determine the frequency at which the cylinder resonates. The resonance frequency depends on the dielectric constant. The body may have a cylindrical, rectangular or other shape having a geometry conducive to producing and measuring electromagnetic fields. The body may be placed within cylinder housing 42, or elsewhere within the hydraulic system where it will be filled with fluid-preferably with a dielectric constant equal or close to that of the fluid within the cylinder.

Other compensation circuits 114 can also generate compensation signals based upon other parameters of the fluid which affect the speed of the pulses through the pressurized hydraulic fluid. For example, compensation signals can be determined directly from the fluid temperature using signals from a thermocouple, RTD, thermistor or other temperature sensor.

When conversion circuit 112 is microprocessor-based, compensation signal 118 can be converted into a digital signal using an appropriate interface (e.g., an A/D converter). The digital compensation signal is used to modify position signal 110. Depending upon the system and application, algorithms or tables for performing this conversion are determined by calibrating the system and, possibly, using appropriate curve fitting algorithms, fuzzy logic, or other well-known techniques.

When conversion circuit 112 does not include a microprocessor, compensation signal 118 is used to modify the signal generated from the variable-width pulse from flip-flop 106. For example, if the variable-width pulse and compensation signals have been converted into DC voltages, then conversion circuit 112 can adjust the DC voltage range signal using the DC voltage compensation signal to generate a compensated piston position signal.

Figure 3:
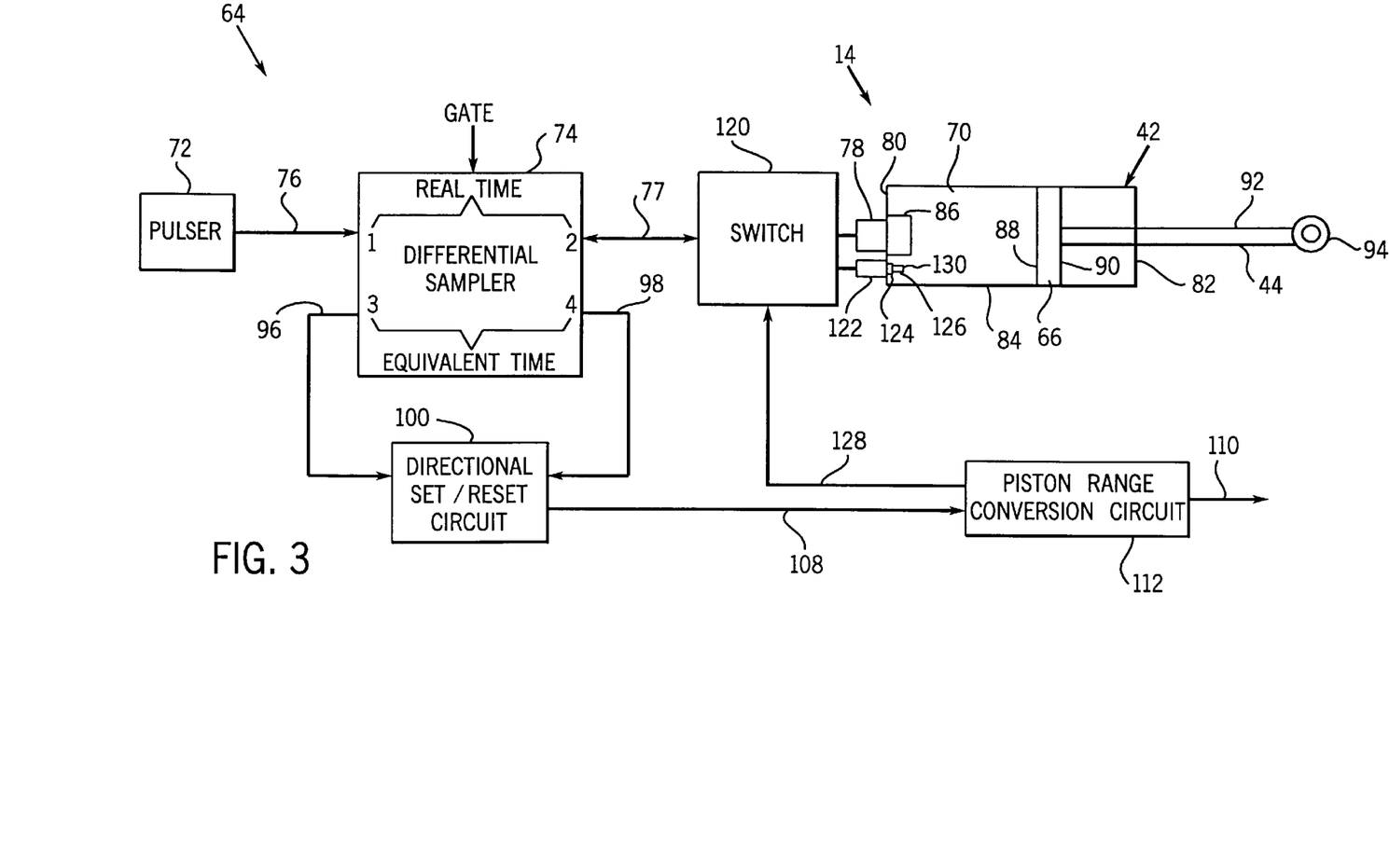
FIG. 3 is a block diagram showing a hydraulic cylinder and a circuit for sensing the position of a piston moveable within the cylinder similar to the circuit shown in FIG. 2 except for a compensation circuit.

Referring to FIG. 3, another MIR system for sensing the position of piston 66 is shown. This embodiment is similar to the embodiment shown in FIG. 2 except the compensation circuit comprises a multiplexer or switch 120, a second transmitter/receiver unit 122, a second pulse launcher 124, and a compensation dipstick 126. Unit 122 is the same or similar to unit 78. Compensation dipstick 126 is a transmission guide of known length (e.g., 1 or 2 inches) which does not interfere with the movement of piston 66. Port 2 of directional sampler 74 is selectively connected to transmitter/receiver units 78 and 122 by switch 120 under the control of a select signal 128 from piston range conversion circuit 112.

When port 2 is connected to transmitter/receiver unit 78, the operation is as described above. However, when port 2 is connected to transmitter/receiver unit 122, the transmitted UWB pulses are launched via pulse launcher 124 along compensation dipstick 126. The UWB pulses are reflected by the electrical impedance discontinuity at the interface between an end 130 of compensation dipstick 126 and the fluid. The reflections detected by the receiver in unit 122 are processed by directional sampler 74 and directional set/reset circuit 100 in the manner described above. Since the length of compensation dipstick 126 is known, the pulse width on line 108 is a measure of the dielectric constant of the fluid. For example, the pulse width could be used as an input to an empirically-determined table or equation which correlates pulse width to dielectric constant.

Figure 4:
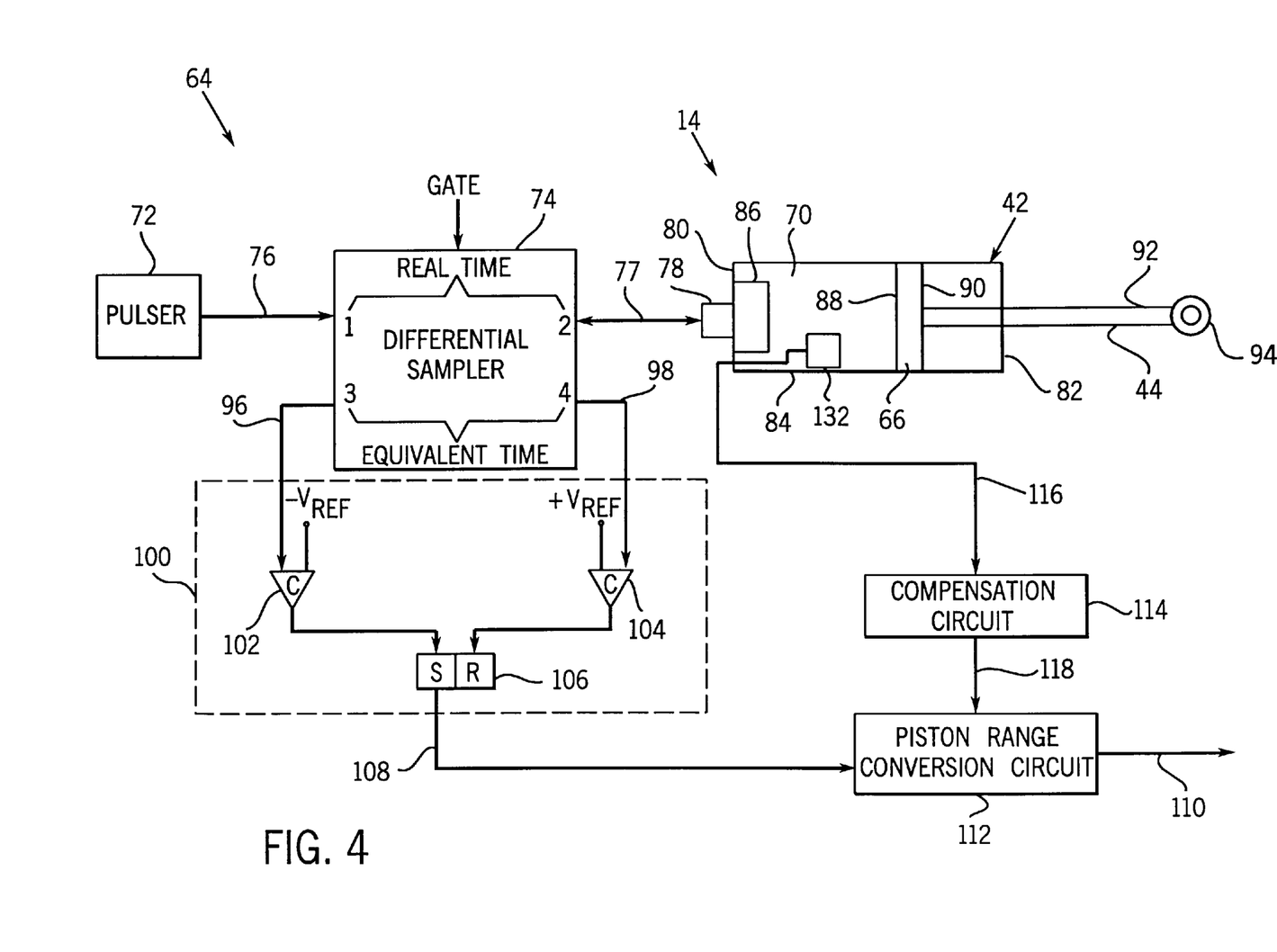
FIG. 4 is a block diagram showing a hydraulic cylinder and a circuit for sensing the position of a piston moveable within the cylinder similar to the circuit shown in FIG. 2 except for a compensation circuit.

FIG. 4 shows an alternative MIR system for sensing the position of piston 66 within the cylinder using a capacitor circuit 132 to generate compensation signal 118 instead of using a PLA circuit which analyzes T pulses as described in FIG. 2. Capacitor circuit 132 is coupled to compensation circuit 114 and mounted within the cylinder near or adjacent to antenna assembly 86. Capacitor circuit 132 includes a pair or metal plates separated by a thin layer (e.g., about 1 mm) of hydraulic fluid. Alternatively, capacitor circuit 132 includes two concentric cylinders separated by fluid. Compensation circuit 114 is configured to measure the capacitance of capacitor circuit 132 which depends upon the dielectric constant of the hydraulic fluid between the capacitor plates. The capacitance signal is used by piston range conversion circuit 112 as a measure of the dielectric constant of the fluid.

Capacitor circuit 132 can also be mounted within a hose which supplies fluid to actuator 14, or within a shunt which receives only a portion of the fluid flowing through the hose. Measuring the dielectric constant of the fluid outside of the cylinder is advantageous because it minimizes modifications to the cylinder. However, temperature differences between fluid within and without the cylinder may adversely impact the accuracy of the compensation signal and, therefore, the accuracy of the piston position signal.

Figure 5:
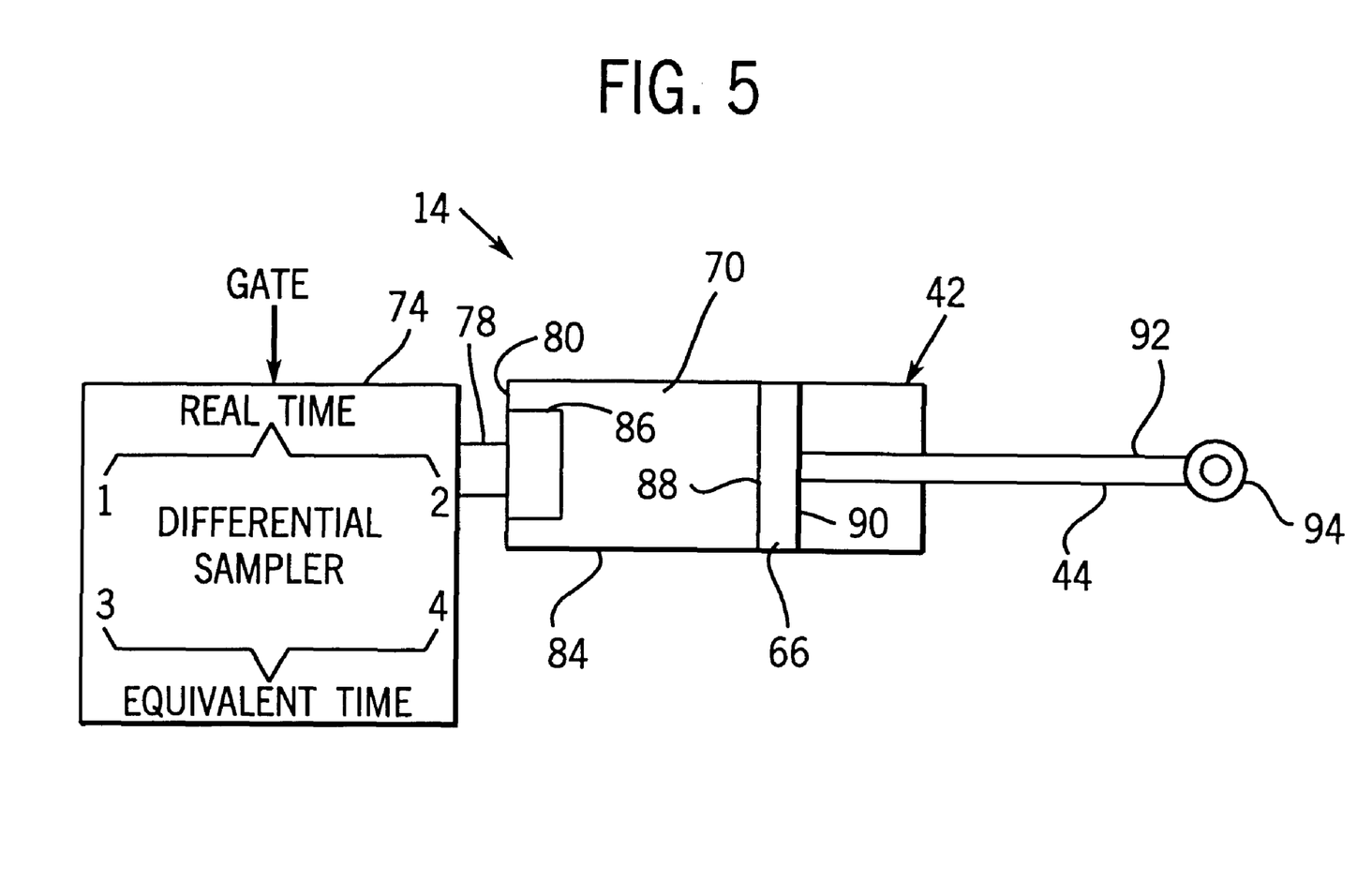
FIG. 5 is a block diagram showing a hydraulic cylinder and a portion of a circuit for sensing the position of a piston moveable within the cylinder similar to the circuit shown in FIG. 2 except the directional sampler and the transmitter/receiver are integral.

Referring to FIG. 5, another embodiment of part of an MIR system for sensing the position of piston 66 is shown. This embodiment is similar to the embodiment of FIG. 2 except directional sampler 74 and transmitter/receiver unit 78 are integral (i.e., one-piece).

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method of determining the position of a piston moveable within a cylinder housing, the cylinder housing enclosing a cavity filled with a fluid, comprising the steps of:

generating real-time electromagnetic (EM) bursts;

launching the real-time EM bursts towards the piston through the fluid within the cavity in the cylinder housing;

detecting real-time reflections of the EM bursts from the piston;

generating an equivalent-time timing signal representative of the time between launching the EM bursts and detecting the reflections, the timing signal being of a slower time scale than that of the real-time EM bursts and reflections; and converting at least the equivalent-time timing signal into a position signal representative of the position of the piston within the cylinder housing.

2. The method of claim 1, wherein the EM bursts include ultra-wideband pulses.

3. The method of claim 1, wherein the EM bursts include pulses having a carrier frequency component.

4. The method of claim 1, wherein the cylinder housing includes a first end, a second end and a side wall between the first and the second ends, and the steps of launching the EM bursts and detecting the reflections are performed by a transmitter and a receiver coupled to the first end of the cylinder housing.

5. The method of claim 1, further comprising the steps of integrating and filtering the reflections of the EM bursts.

6. The method of claim 1, further comprising the step of generating a compensation signal responsive to a parameter of the fluid within the cavity in the cylinder housing, and the converting step includes converting at least the timing and compensation signals into the position signal.

7. The method of claim 6, wherein the compensation signal is responsive to the dielectric constant of the fluid.

8. The method of claim 7, wherein the step of generating a compensation signal includes applying an excitation signal at varying frequencies to a body having a cavity filled with the fluid and determining the resonance frequency.

9. The method of claim 7, wherein the step of generating a compensation signal includes measuring the capacitance of a pair of conductors having a layer of the fluid therebetween.

10. The method of claim 7, wherein the step of generating a compensation signal includes measuring the electrical impedance discontinuity between an end of a compensation dipstick and the fluid.

11. An apparatus for determining the position of a piston moveable within a cylinder housing, the cylinder housing enclosing a cavity filled with a fluid, comprising:

a generator for generating real-time EM bursts;

a transmitter coupled to the generator and to the cylinder housing, the transmitter configured to launch the real-time EM bursts towards the piston through the fluid within the cavity in the cylinder housing;

a receiver coupled to the cylinder housing and configured to detect real-time reflections after the EM bursts are reflected by the piston towards the receiver;

a timing circuit configured to generate an equivalent-time timing signal representative of the time for the EM bursts to travel from the transmitter to the piston and for the reflections to travel from the piston to the receiver, the timing signal being of a slower time scale than that of the EM bursts and reflections; and a conversion circuit configured to convert at least the equivalent-time timing signal into a position signal representative of the position of the piston within the cylinder housing.

12. The apparatus of claim 11, wherein the EM bursts include ultra-wideband pulses.

13. The apparatus of claim 11, wherein the EM bursts include pulses having a carrier frequency component.

14. The apparatus of claim 11, wherein the cylinder housing includes a first end, a second end and a side wall between the first and the second ends, and the transmitter and the receiver are coupled to the first end of the cylinder housing.

15. The apparatus of claim 11, further comprising:

an antenna assembly electrically coupled to the transmitter and the receiver, the antenna assembly configured to focus the EM bursts, to launch the EM bursts with the transmitter, and to detect the reflected EM bursts with the receiver.

16. The apparatus of Claim 11, further comprising:

a directional sampler circuit having a first real-time port for receiving the EM bursts from the generator, a second real-time port coupled to the first port for sending the EM bursts to the transmitter and for receiving the reflections, a third port coupled to the first port and isolated from the second port for providing an equivalent-time representation of the EM bursts, and a fourth port coupled to the second port and isolated from the first port for providing an equivalent-time representation of the reflections, wherein the equivalent-time representations of the EM bursts from the third port and the reflections from the fourth port are applied to the timing circuit.

17. The apparatus of claim 16, wherein the timing circuit includes a first comparator circuit coupled to the third port, a second comparator circuit coupled to the fourth port, and a set-reset flip-flop circuit set by the equivalent-time representation of the EM bursts and reset by the equivalent-time representation of the reflections.

18. The apparatus of claim 11, further comprising a compensation circuit configured to generate a compensation signal responsive to a parameter of the fluid within the cavity in the cylinder housing, wherein the conversion circuit is configured to convert at least the timing and compensation signals into the position signal.

19. The apparatus of claim 18, wherein the compensation signal is responsive to the dielectric constant of the fluid.

20. The apparatus of claim 19, wherein the compensation circuit is configured to apply an excitation signal at varying frequencies to a body having a cavity filled with the fluid and to determine the resonance frequency.

21. The apparatus of claim 19, wherein the compensation circuit includes a pair of conductors having a layer of the fluid therebetween.

22. The apparatus of claim 19, wherein the compensation circuit includes:

a compensation dipstick;

a second generator coupled to the compensation dipstick and configured to generate second EM bursts;

a second transmitter coupled to the second generator and to the cylinder housing, the second transmitter configured to launch the second EM bursts along the compensation dipstick towards the piston; and a second receiver coupled to the cylinder housing and configured to detect second reflections after the second EM bursts are reflected by the piston towards the second receiver.

23. An electrohydraulic control system for controlling the position of an implement, the implement having at least one joint which is moved by extending or retracting at least one cylinder coupled to the joint, comprising:

an input device configured to generate command signals representative of a commanded position of the implement;

a source of pressurized hydraulic fluid;

a valve assembly coupled between the cylinder and the source, the valve assembly configured to control the flow of hydraulic fluid between the cylinder and the source in response to control signals;

a micropower impulse radar (MIR) sensor system coupled to the cylinder and configured to sense movement of the cylinder and to generate a position signal representative of the position of the implement, the MIR sensor system being configured to sense the movement using time domain reflectometry based on real-time signals traveling through the hydraulic fluid within a cavity of the cylinder; and a control circuit coupled to the input device, the valve assembly, and the MIR sensor system, the control circuit configured to generate the control signals based upon the command signals and the position signal and to apply the control signals to the valve assembly.

24. The system of claim 23, wherein the implement includes an agricultural header mounted to an agricultural harvesting vehicle.

25. The system of claim 23, wherein the MIR sensor system includes:

a generator for generating EM bursts;

a transmitter coupled to the generator, the transmitter configured to launch EM bursts through a cavity in the cylinder filled with a fluid;

a receiver configured to detect reflections after the EM bursts are reflected by a piston in the cylinder towards the receiver;

a timing circuit configured to generate a time signal representative of the time for the EM bursts to travel from the transmitter to the piston and for the reflections to travel from the piston to the receiver; and a conversion circuit configured to convert at least the timing signal into a position signal representative of the position of the piston within the cylinder.

26. The system of claim 25, further comprising:

an antenna assembly electrically coupled to the transmitter and the receiver, the antenna assembly configured to focus the EM bursts, to launch the EM bursts with the transmitter, and to detect the reflected EM bursts with the receiver.

* * * * *